UNITED STATES PATENT OFFICE.

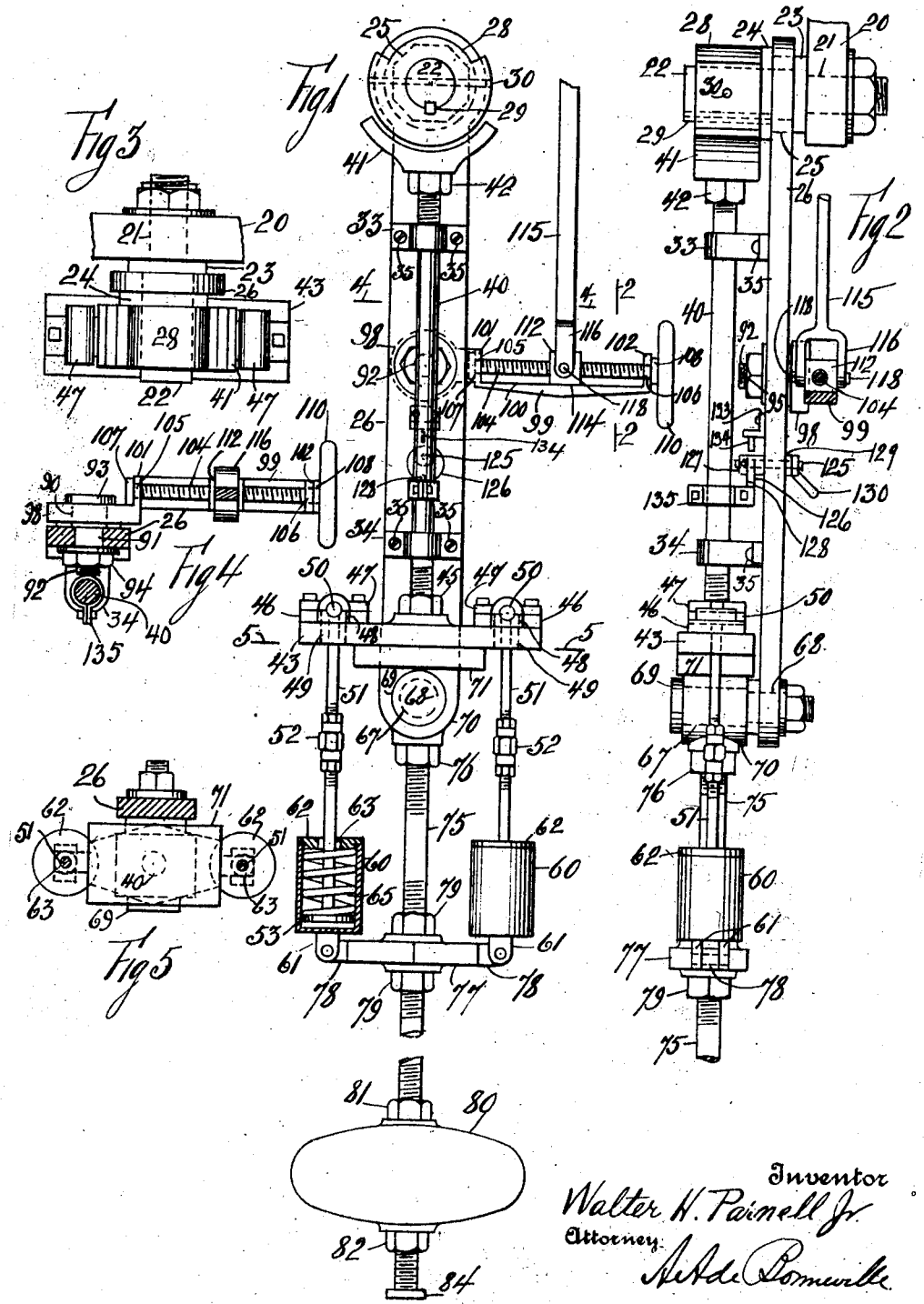

WALTER H. PARNELL, JR., OF BROOKLYN, NEW YORK.

AUTOMATICALLY-REGULATED PENDULUM.

1,378,824. Specification of Letters Patent. Patented May 17, 1921.

Application filed May 31, 1918. Serial No. 237,670.

*To all whom it may concern:*

Be it known that I, WALTER H. PARNELL, Jr., citizen of the United States, and resident of the borough of Brooklyn, city of New York, in the county of Kings and State of New York, have invented certain new and useful Improvements in an Automatically-Regulated Pendulum, of which the following is a specification.

This invention relates to an automatically regulated pendulum which is easily adapted to control the stabilizing device of a flying machine.

The invention has for its object the production of means for controlling the ailerons, or balancing apparatus, of a flying machine, so that it will gradually assume different positions without shock or jar.

Figure 1 shows an outside elevation of the automatically regulated pendulum; Fig. 2 represents a right hand side view of Fig. 1 with a section of Fig. 1 on the line 2, 2; Fig. 3 is a partial top plan view of Fig. 1; Fig. 4 represents a section of Fig. 1 on the line 4, 4 and Fig. 5 shows a section of Fig. 1 on the line 5, 5.

A supporting bracket 20 has secured therein a pivot pin having the small portion 21 and the large portion 22 with the flange collar 23. A bushing with the flange collar 24 and the eight sided portion 25 is supported upon the portion 22 of the pivot pin. The bushing supports the top end of the link 26. Upon the portion 22 of the pin is fastened the stationary brake body 28 by means of the key 29 and the pin 30. A pair of similar guide brackets 33, 34 are secured to the link 26 by means of the screws 35. A guide rod 40 is guided in the guide brackets 33, 34 and at its upper end carries in threaded engagement the brake shoe 41. A lock nut 42 locks the rod 40 to the shoe 41. A bearing plate 43 is in threaded engagement with the lower end of the rod 40 and is locked thereto by means of the lock nut 45. A pair of journal boxes 46, with caps 47 are mounted on the bearing plate 43. Clearance openings 48 are formed in the journal boxes 46 and clearance openings 49 are formed in the plate 43. A pin 50 is supported in each of the journal boxes 46. From each pin 50 extends a rod 51 that comprises a pair of members connected by a turnbuckle 52. To the lower end of each rod 51 is fastened a disk 53. A pair of barrels are shown each with the body portion 60, having extending from the lower portion thereof a bifurcated lug 61, and at the upper end is the threaded cap 62 having the opening 63. A spring 65 in each body portion 60 is supported upon the disk 53 and bears against the cap 62.

A pivot pin is shown with the large portion 67 and the small portion 68. A flange collar 69 is formed with the portion 67. The portion 68 is supported in an opening in the lower end of the link 26. A bearing bracket 70 with the bearing cap 71 is pivoted on the portion 67 of the latter pivot pin. A rod 75 is in threaded engagement with the bracket 70. A lock nut 76 locks the rod 75 to the bracket 70. A bracket 77 with the journal lugs 78 is supported upon the rod 75, and nuts 79 lock the bracket 77 to the rod 75. A pendulum weight 80 is supported at the lower end of the rod 75, and lock nuts 81, 82, lock the weight 80 to the rod 75. A collar 84 is fastened to the lower end of the rod 75. A pivot pin is shown with the larger portion 90, the smaller portions 91 and 92 and the collar 93. The latter pivot pin is pivoted on the link 26 and is maintained in place by means of the nut 94 and the pin 95. An adjusting bracket 98 is pivoted on the portion 90 and has formed therewith the arm 99 with the smooth face 100. Flange brackets 101 and 102 are formed with the arm 99. A threaded rod 104 with journal ends 105, 106 is journaled in the flange brackets 102 and 101. Collars 107 and 108 are fastened to the ends 105 and 106. An adjusting wheel 110 is fastened to the end 106 of the screw 104. A box shaped nut 112 is in threaded engagement with the screw 104, and its lower side 114 bears against the face 100 of the arm 99. A link 115, pivoted on a pin at its upper end, not shown, has formed therewith the bifurcated end 116 which is pinned to the nut 112 by means of the pins 118.

In the link 26 is pivoted the pin 125 which at one end has attached thereto the cam 126 having the hub 127. In the face of the cam is formed the slot 128. A washer is shown at 129 and a handle 130 is secured to the pin 125. A bracket 133 is fastened to the link 26 and has extending therefrom a spring catch 134 which can engage the slot 128 of the cam 126. A pair of clamps 135 are secured to the rod 40.

When using the invention the pendulum weight 80 always tends to maintain the link 26 with its appurtenances in a vertical position. When the supporting bracket 20 which in this instance is secured to a flying machine moves from its normal position, the link 26 being pivoted on the pin with the portion 22 tends to remain in its vertical position by gravity, and thereby the said link 26 swings and pulls or pushes the adjusting bracket 98. Thereby the link 115 is pulled or pushed from its normal position swinging on its pin at its upper end. The link 115 controls a stabilizing device, not shown, of the flying machine. When the pendulum again is located in its normal position on the bracket 20, then the stabilizing device is brought to its normal position. The position of the link 115 can be adjusted by the adjusting wheel 110.

When a sudden gust of wind moves the wing of the stabilizer, or aileron, the link 26 is pushed or pulled by the link 115, but the weight 80 tends to remain stationary by reason of its inertia.

An angle is then made between the abutting faces of the bearing plate 43 and the cap 71, which moves the guide rod 40 upwardly and causes the brake shoe 41 to bear against the stationary brake body 28. This stops the swinging movement of the link 26 and holds the stabilizing device in place. This limits the motion of the wings of the stabilizer and holds said wings in place and prevents the stabilizing device from tipping with a sudden gust of wind. When the inertia of the weight 80 is overcome the rod 75 is again brought in alinement with the rod 40, and the brake shoe 41 is released from the brake body 28, and thereby locates the portions of the pendulum in their normal positions. The rods 51 with the springs 65 normally maintain the plate 43 and cap 71 against each other. The proper pressure between the plates 43 and 71, is regulated by adjusting the bracket 77 in proper position by means of the nuts 79 and the turn buckles 52.

When the flying machine is in a normal flying plane, or angle, the link 26 is maintained in a vertical position by means of the weight 80, but if the angle of flying of the flying machine changes, the link 26 tends to remain vertical and a corresponding change of the stabilizing device takes place relative to the change of flying plane or angle, to restore the flying machine to its normal plane or angle.

The position of the link 26 with its coacting pendulum can be manually controlled by the operator moving in one direction or the other the adjusting wheel 110.

When the brake shoe 41 is not to perform its functions the cam 126 is located in its lowest position as indicated in the drawings, by means of the handle 130. In this position the cam 126 bears against the top edge of the clamps 135 and the shoe 41 is held in place separated from the brake body 28. When the brake shoe 41 is to perform its functions the cam 126 is turned up so that the slot 128 is engaged by the spring catch 134.

Having described my invention what I desire to secure by Letters Patent and claim is:

1. In a pendulum the combination of a pair of members, a bearing plate at the lower end of one of the members, a bearing cap at the accompanying end of the other member, said plate normally bearing on said cap and a brake to retard the movements of said pendulum when the members thereof are thrown out of alinement.

2. In a pendulum controlled stabilizer for air craft the combination of a pair of members normally in alinement with each other and the bottom end of one member bearing on the top end of the other member when they are in alinement, a brake connected with one of the members and effective when they are out of alinement, and means to locate an element of a flying machine in different positions with different positions of the pendulum.

3. In a pendulum controlled stabilizer for air craft the combination of a pair of members normally in alinement with each other and the bottom end of one member bearing on the top end of the other member when they are in alinement, a brake connected with one of the members and effective when they are out of alinement, flexible connections between the members and means to locate an element of a flying machine in different positions with different positions of the pendulum.

4. In a pendulum controlled stabilizer for air craft the combination of a pair of members, a pin, a link pivoted on the pin, one member of the pendulum pivoted to the link, a second member of the pendulum with its bottom end bearing on the top end of the first member, a brake connection between the second member of said pendulum and said pin, an arm pivoted to said link, a second link and means to locate the second link in different positions with respect to said arm.

5. In a pendulum controlled stabilizer for air craft the combination of a pair of members, a pin, a link pivoted on the pin, one member of the pendulum pivoted to the link, a second member of the pendulum with its bottom end bearing on the top end of the first member, a brake connection between the second member of said pendulum and said pin, an arm pivoted to said link, a second link controlling an element in a flying machine and means coacting with said arm to locate the second link in different positions.

6. In a pendulum controlled stabilizer for air craft the combustion of a pair of members, a pin, a link pivoted on the pin, one member of the pendulum pivoted on the swinging end of the link, a second member of the pendulum normally bearing on the first member, flexible connections between the two members, a brake connection between the second member and said pin, and an element between the link and an element of a flying machine.

7. In a pendulum the combination of a pair of members, a pin, a stationary brake body secured to the pin, a link pivoted on the pin, one member of the pendulum pivoted to the link, the said member having a cap with a bearing surface, a bearing plate for the other member of the pendulum normally bearing on said cap, the second member slidably supported by said link, a brake shoe carried by said second member and located to bear against said bridge body when the members of the pendulum are not in alinement and flexible connections between the members of the pendulum.

8. In a pendulum controlled stabilizer for air craft the combination of a pair of members, a pin, a stationary brake body secured to the pin, a link pivoted on the pin, one member of the pendulum pivoted to the link and having a bearing cap, a weight adjustably carried by the member, a bracket adjustably supported on the member, a pair of buffers carried by the bracket, rods for the buffers, a second member for the pendulum, a bearing plate for the said second member normally supported on the bearing cap of the first member, one end of each of said rods hinged to the bearing plate, a brake shoe carried by the second member and located to bear against said brake body when the members of the pendulum are out of alinement and a connection carried on the link for an element on a flying machine.

9. The combination of a link suspended at its upper end, a pendulum comprising a pair of members, one of said members pivoted on the lower end of the link, the other members guided by said link and bearing on the first member, flexible connections between the members and means to manually move the link and thereby adjust the members of the pendulum.

10. In a pendulum the combination of a pair of members normally in alinement with each other, the bottom end of one member bearing on the top end of the other member when they are in alinement, a brake connected with one of the members and means to lock the brake out of operative position.

11. In a pendulum the combination of a pair of members, a pin to support the pendulum, a stationary brake body secured to the pin, a link pivoted on the pin, one member of the pendulum pivoted to the link, the second member of the pendulum with its bottom end bearing on the top end of the first member, a brake shoe carried by said second member and located to bear against said brake body when the members of the pendulum are not in alinement, an adjustable cam pivoted to said link and a strap secured to the said second member in the path of said cam and enabled to contact therewith.

12. In a pendulum the combination of a pair of members, a pin to support the pendulum, a stationary brake body secured to the pin, a link pivoted on the pin, one member of the pendulum pivoted to the link, the second member of the pendulum with its bottom end bearing on the top end of the first member, a brake shoe carried by said second member and located to bear against said brake body when the members of the pendulum are not in alinement, an adjustable cam having a slot in its periphery pivoted to said link, a strap secured to said second member in the path of said cam and enabled to contact therewith and means to hold said cam out of contact with said strap.

Signed at the borough of Manhattan, city of New York, in the county of New York and State of New York this 27th day of May A. D. 1918.

WALTER H. PARNELL, Jr.

Witnesses:
  A. A. de Bonneville,
  Jack Nile.